US012785864B2

(12) United States Patent
Yang

(10) Patent No.: US 12,785,864 B2
(45) Date of Patent: Nov. 3, 2026

(54) METHOD AND DEVICE FOR CREATING SEMI-STATIC HARQ CODEBOOK, APPARATUS AND READABLE STORAGE MEDIUM

(71) Applicants: China Mobile Communication Co., Ltd Research Institute, Beijing (CN); China Mobile Communications Group Co.,Ltd., Beijing (CN)

(72) Inventor: Tuo Yang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 283 days.

(21) Appl. No.: 18/549,455

(22) PCT Filed: Mar. 4, 2022

(86) PCT No.: PCT/CN2022/079284

§ 371 (c)(1),
(2) Date: Sep. 7, 2023

(87) PCT Pub. No.: WO2022/199359

PCT Pub. Date: Sep. 29, 2022

(65) Prior Publication Data

US 2024/0163028 A1 May 16, 2024

(30) Foreign Application Priority Data

Mar. 26, 2021 (CN) ........................ 202110326142.7

(51) Int. Cl.
*H04L 1/1829* (2023.01)
*H04W 72/0446* (2023.01)
*H04W 72/232* (2023.01)

(52) U.S. Cl.
CPC ....... *H04L 1/1861* (2013.01); *H04W 72/0446* (2013.01); *H04W 72/232* (2023.01)

(58) Field of Classification Search
CPC .................................................... H04L 1/1861
See application file for complete search history.

(56) References Cited

U.S. PATENT DOCUMENTS 11,159,282 B2 * 10/2021 Hwang ................. H04L 1/1896
11,627,593 B2 * 4/2023 Si ...................... H04W 72/1273 370/329

(Continued)

FOREIGN PATENT DOCUMENTS

| | | | |
|---|---|---|---|
| CN | 110324132 | A | 10/2019 |
| CN | 112311512 | A | 2/2021 |
| EP | 4307589 | A1 | 1/2024 |

OTHER PUBLICATIONS

CMCC, "Discussion on group scheduling mechanisms", 3GPP TSG RAN WG1 #104-e, R1-2101063, e-Meeting, Jan. 25-Feb. 5, 2021.

(Continued)

*Primary Examiner* — Guang W Li
(74) *Attorney, Agent, or Firm* — Price Heneveld LLP

(57) ABSTRACT

A method for generating a semi-static HARQ codebook includes determining at least one of a set of candidate PDSCH reception occasions or a bit length of an HARQ-ACK codebook based on first configuration information. Accordingly, the quantity of occasions for candidate PDSCH receptions in the set of occasions for candidate PDSCH receptions is determined based on a type of a time domain resource allocation table.

20 Claims, 8 Drawing Sheets

(56) References Cited

U.S. PATENT DOCUMENTS

| | | | | |
|---|---|---|---|---|
| 11,997,682 | B2 * | 5/2024 | Choi | H04L 1/1812 |
| 12,426,042 | B2 * | 9/2025 | Yi | H04W 72/1268 |
| 2017/0347341 | A1 | 11/2017 | Zhang et al. | |
| 2019/0306841 | A1 | 10/2019 | Huang et al. | |
| 2020/0106566 | A1 * | 4/2020 | Yeo | H04L 1/1812 |
| 2020/0328849 | A1 | 10/2020 | Noh et al. | |
| 2021/0021386 | A1 * | 1/2021 | Gao | H04L 1/1819 |
| 2021/0099255 | A1 * | 4/2021 | Gao | H04L 1/189 |
| 2021/0135793 | A1 * | 5/2021 | Xiao | H04L 1/1861 |
| 2021/0218539 | A1 * | 7/2021 | Hu | H04L 1/1861 |
| 2021/0314094 | A1 * | 10/2021 | Gao | H04L 5/0091 |
| 2021/0359796 | A1 * | 11/2021 | Zhang | H04L 1/1854 |
| 2022/0095344 | A1 * | 3/2022 | Shi | H04W 72/04 |
| 2022/0224455 | A1 * | 7/2022 | Falahati | H04L 1/1812 |
| 2022/0271873 | A1 * | 8/2022 | Gao | H04L 1/1854 |
| 2022/0295457 | A1 * | 9/2022 | Jang | H04L 5/0053 |
| 2022/0346104 | A1 * | 10/2022 | Yi | H04L 1/1614 |
| 2022/0377773 | A1 * | 11/2022 | Wang | H04W 72/0446 |
| 2023/0006798 | A1 * | 1/2023 | Lee | H04B 7/0456 |
| 2023/0112147 | A1 * | 4/2023 | Chien | H04L 1/1854 370/329 |
| 2023/0261805 | A1 * | 8/2023 | Liu | H04L 1/1854 370/312 |
| 2023/0422275 | A1 * | 12/2023 | Kim | H04L 5/0055 |
| 2024/0163018 | A1 * | 5/2024 | Zhou | H04L 1/1607 |

OTHER PUBLICATIONS

Samsung, "PDSCH/PUSCH enhancements for NR from 52.6 GHz to 71 GHz", 3GPP TSG RAN WG1 #104-e, R1-2101198, e-Meeting, Jan. 25-Feb. 5, 2021.

VIVO, Discussion on mechanisms to improve reliability for RRC_CONNECTED UEs, 3GPP TSG RAN WG1 #102-e, R1-2005407,e-Meeting, Aug. 17-28, 2020.

VIVO, Discussion on mechanisms to improve reliability for RRC_CONNECTED UEs, 3GPP TSG RAN WG1 #103-e, R1-2007692, e-Meeting, Oct. 26-Nov. 13, 2020.

* cited by examiner

METHOD AND DEVICE FOR CREATING SEMI-STATIC HARQ CODEBOOK, APPARATUS AND READABLE STORAGE MEDIUM

CROSS-REFERENCE TO RELATED APPLICATION

This application is the U.S. national phase of PCT Application No. PCT/CN2022/079284 filed on Mar. 4, 2022, which claims a priority of the Chinese patent application No. 202110326142.7 filed on Mar. 26, 2021, which are incorporated herein by reference in their entireties.

TECHNICAL FIELD

The present disclosure relates to the field of communication technology, in particular to a method and a device for creating a semi-static Hybrid Automatic Repeat reQuest (HARQ) codebook, an apparatus, and a readable storage medium.

BACKGROUND

The design of a New Radio (NR) semi-static HARQ codebook mainly includes two steps.

Step 1: determining a set of occasions for candidate Physical Downlink Shared Channel (PDSCH) receptions.

In other words, with respect to an HARQ Acknowledgement (HARQ-ACK) feedback within a certain slot n, a set of all transmitted downlink data for which the HARQ-ACK feedback needs to be provided needs to be determined based on such parameters as a candidate first set of HARQ feedback timing values K1, a Time Division Duplex (TDD) frame structure configuration, a time domain resource allocation parameter and a Carrier Aggregation (CA) offset.

In the NR, a User Equipment (UE) may support to receive multiple TDM (Time-division multiplexing) PDSCHs within one slot, which needs to be taken into consideration in the design of the NR semi-static HARQ codebook.

To be specific, when the UE does not support to receive multiple TDM (Time-division multiplexing) PDSCHs, one slot is taken as one PDSCH reception occasion. When the UE supports to receive multiple TDM (Time-division multiplexing) PDSCHs, the UE selects rows which do not overlap with each other in terms of time resources based on one or more configured time domain resource allocation tables, so as to determine multiple PDSCH reception occasions within the slot.

Step 2: on the basis of the set of occasions for candidate PDSCH receptions for each cell determined in Step 1, generating, by the UE, ACK information or Negative ACK (NACK) information on each occasion for candidate PDSCH reception based on whether the PDSCH has been received.

An existing NR technology only supports unicast service, and HARQ mechanism is also introduced in multicast/broadcast technology as an NR evolved technology. In the existing NR technology, the time domain resource allocation table is configured separately for each UE, i.e., the time domain resource allocation tables are different for the UEs. The UE only needs to determine the set of occasions for candidate PDSCH receptions for the semi-static HARQ codebook based on its own time domain resource allocation table.

However, after the introduction of the NR multicast/broadcast technology, multiple UE which receives the same multicast/broadcast service has a same PDSCH time domain resource allocation table, which may be different from a UE-specific time domain resource allocation tables for transmitting the unicast service. In addition, a set of PDSCH HARQ feedback timing values K1 for the multicast/broadcast service may also be different from a set of PDSCH HARQ feedback timing values K1 for the unicast service. Hence, there is an urgent need to provide a comprehensive scheme about how to take these two types of time domain resource allocation tables and two types of sets of K1 into consideration when determining the set of occasions for candidate PDSCH receptions for the semi-static HARQ codebook.

SUMMARY

An object of the present disclosure is to provide a method and a device for creating a semi-static HARQ codebook, an apparatus and a readable storage medium, so as to create the semi-static HARQ codebook based on various time domain resource allocation tables.

In one aspect, the present disclosure provides in some embodiments a method for creating a semi-static HARQ codebook, including determining a set of candidate PDSCH reception occasions and/or a bit length of an HARQ-ACK codebook based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is a set of HARQ feedback timing values K1 being associated with unicast PDSCH, the UE-specific PDSCH, UE-specific Downlink Control Information (DCI), or DCI for scheduling the unicast PDSCH, and the second set of HARQ feedback timing values K1 is a set of HARQ feedback timing values K1 being associated with the multicast and/or broadcast PDSCH, the PDSCH common to the UEs, DCI common to the UEs, or DCI for scheduling the multicast PDSCH and/or broadcast PDSCH.

In some possible embodiments of the present disclosure, the UE-specific PDSCH is a PDSCH scheduled by DCI where Cyclic Redundancy Check (CRC) is scrambled with a UE-specific Radio Network Temporary Identity (RNTI), the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

In some possible embodiments of the present disclosure, the determining the set of occasions for candidate PDSCH receptions based on the first configuration information includes one of: a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table; a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

In some possible embodiments of the present disclosure, the determining the bit length of the HARQ-ACK codebook based on the first configuration information includes determining the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

In some possible embodiments of the present disclosure, subsequent to the determining the set of occasions for candidate PDSCH receptions based on the first configuration information, the method further includes determining the bit length of the HARQ-ACK codebook based on the quantity of occasions for candidate PDSCH receptions in the set of occasions for candidate PDSCH receptions.

In some possible embodiments of the present disclosure, the method further includes determining HARQ-ACK information bits based on a decoding result of the PDSCH at each occasion for candidate PDSCH reception in the set of occasions for candidate PDSCH receptions and/or a length of the HARQ-ACK codebook.

In some possible embodiments of the present disclosure, the determining the HARQ-ACK information bits based on the decoding result of the PDSCH at each occasion for candidate PDSCH reception in the set of occasions for candidate PDSCH receptions and/or the length of the HARQ-ACK codebook includes: in the case that the quantity of elements in the determined set of occasions for candidate PDSCH receptions is smaller than the maximum value of the first element quantity and the second element quantity, determining the corresponding HARQ-ACK information bits based on the decoding result of the PDSCH at each occasion for candidate PDSCH reception in the set of occasions for candidate PDSCH receptions, and adding NACK bits until a bit length is equal to the bit length of the HARQ-ACK codebook; or in the case that the quantity of elements in the determined set of occasions for candidate PDSCH receptions is equal to the maximum value of the first element quantity and the second element quantity, determining the corresponding HARQ-ACK information bits based on the decoding result of the PDSCH at each occasion for candidate PDSCH reception in the set of occasions for candidate PDSCH receptions.

In another aspect, the present disclosure provides in some embodiments a device for creating a semi-static HARQ codebook, including a first determination module configured to determine a set of candidate PDSCH reception occasions and/or a bit length of an HARQ-ACK codebook based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is a set of HARQ feedback timing values K1 being associated with unicast PDSCH, the UE-specific PDSCH, UE-specific DCI, or DCI for scheduling the unicast PDSCH, and the second set of HARQ feedback timing values K1 is a set of HARQ feedback timing values K1 being associated with the multicast and/or broadcast PDSCH, the PDSCH common to the UEs, DCI common to the UEs, or DCI for scheduling the multicast PDSCH and/or broadcast PDSCH.

In some possible embodiments of the present disclosure, the UE-specific PDSCH is a PDSCH scheduled by DCI where CRC is scrambled with a UE-specific RNTI, the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

In some possible embodiments of the present disclosure, the first determination module is further configured to perform one of: a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table; a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

In some possible embodiments of the present disclosure, the first determination module is further configured to determine the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

In some possible embodiments of the present disclosure, the device further includes a second determination module configured to determine the bit length of the HARQ-ACK codebook based on the quantity of occasions for candidate PDSCH receptions in the set of occasions for candidate PDSCH receptions.

In some possible embodiments of the present disclosure, the device further includes a third determination module configured to determine HARQ-ACK information bits based on a decoding result of the PDSCH at each occasion for candidate PDSCH reception in the set of occasions for candidate PDSCH receptions and/or a length of the HARQ-ACK codebook.

In some possible embodiments of the present disclosure, the third determination module is further configured to: in the case that the quantity of elements in the determined set of occasions for candidate PDSCH receptions is smaller than the maximum value of the first element quantity and the second element quantity, determine the corresponding HARQ-ACK information bits based on the decoding result of the PDSCH at each occasion for candidate PDSCH reception in the set of occasions for candidate PDSCH receptions, and add NACK bits until a bit length is equal to the bit length of the HARQ-ACK codebook; or in the case that the quantity of elements in the determined set of occasions for candidate PDSCH receptions is equal to the maximum value of the first element quantity and the second element quantity, determine the corresponding HARQ-ACK information bits based on the decoding result of the PDSCH at each occasion for candidate PDSCH reception in the set of occasions for candidate PDSCH receptions.

In yet another aspect, the present disclosure provides in some embodiments a UE, including a processor, a memory, and a program stored in the memory and executed by the processor. The program is executed by the processor so as to implement the steps of the above-mentioned method.

In still yet another aspect, the present disclosure provides in some embodiments a network side device, including a processor, a memory, and a program stored in the memory and executed by the processor. The program is executed by the processor so as to implement the steps of the above-mentioned method.

In still yet another aspect, the present disclosure provides in some embodiments a readable storage medium storing therein a program. The program is executed by a processor so as to implement the steps of the above-mentioned method.

According to the embodiments of the present disclosure, the quantity of occasions for candidate PDSCH receptions in the set of occasions for candidate PDSCH receptions is determined based on a type of the time domain resource allocation table, so it is able to save the HARQ-ACK information bits.

BRIEF DESCRIPTION OF THE DRAWINGS

Through reading the detailed description hereinafter, the other advantages and benefits will be apparent to a person skilled in the art. The drawings are only used to show the preferred embodiments, but shall not be construed as limiting the present disclosure. In addition, in the drawings, same reference symbols represent same members. In these drawings.

DETAILED DESCRIPTION

Figure 1:
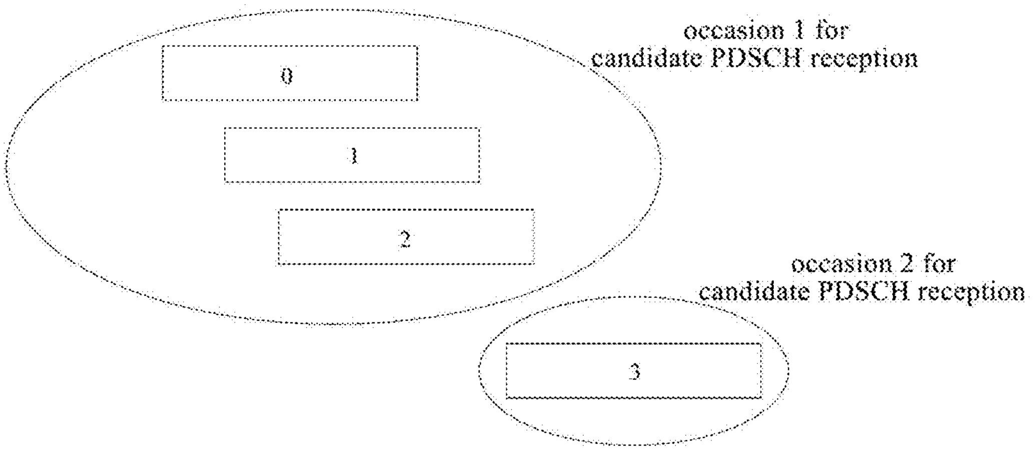
FIG. 1 is a schematic view showing candidate PDSCH reception occasions and rows in corresponding PDSCH time domain resource allocation tables.

As shown in FIG. 1, for a certain downlink slot, rows 0, 1 and 2 are row indexes in a PDSCH time domain resource allocation table for unicast service (a first time domain resource allocation table), row 3 is a row index in a PDSCH time domain resource allocation table for multicast/broadcast service (a second time domain resource allocation table), and each row represents a start symbol of a PDSCH and a symbol length. When a UE supports to receive a PDSCH for a TDD unicast service and a PDSCH for the multicast/broadcast service within one slot, it is necessary to determine two candidate PDSCH reception occasions based on the four rows.

In addition, for the UE, two set of HARQ feedback timing values K1 are configured to provide HARQ feedback for the PDSCH for the multicast/unicast service (a second set of HARQ feedback timing values K1) and HARQ feedback for the PDSCH for the unicast service (a first set of HARQ feedback timing values K1). For K1 included in both the two K1 sets, two candidate PDSCH reception occasions need to be determined based on the four rows. Otherwise, for a certain K1, it only exists in a candidate PDSCH reception occasion 1 or a candidate PDSCH reception occasion 2, rather than in both of them.

In addition, whether the UE supports to receive the PDSCH for the TDD unicast service and the PDSCH for the multicast/broadcast service within one slot also depends on a UE capability. When determining a set of candidate PDSCH reception occasions for a semi-static HARQ codebook, different UE capabilities also need to be taken into consideration.

Referring to FIG. 1 again, when the UE does not support to receive the PDSCH for the TDD unicast service and the PDSCH for the multicast/broadcast service within one slot, there is only the candidate PDSCH reception occasion 1 or the candidate PDSCH reception occasion 2, rather than both of them, within the slot.

An object of the present disclosure is to provide a method for creating a semi-static HARQ codebook, which is adapted to such a new scenario where a time domain resource allocation table for unicast service, a time domain resource allocation table for multicast/broadcast service, a set of HARQ feedback timing values K1 for a PDSCH for the unicast service and a set of HARQ feedback timing values K1 for a PDSCH for the multicast/broadcast service are configured for each UE and different UEs have different PDSCH reception capabilities. The quantity of PDSCH reception occasions and a length of the HARQ codebook are determined depending on different scenarios, without any necessity to determine the length of the HARQ codebook based on the maximum quantity of PDSCH reception occasions, so it is able to improve the reliability of the HARQ feedback and reduce a resource overhead for the HARQ feedback.

In order to make the objects, the technical solutions and the advantages of the present disclosure more apparent, the present disclosure will be described hereinafter in a clear and complete manner in conjunction with the drawings and embodiments. Obviously, the following embodiments only relate to a part of, rather than all of, the embodiments of the present disclosure, and based on these embodiments, a person skilled in the art may, without any creative effort, obtain the other embodiments, which also fall within the scope of the present disclosure.

Such terms as "include" or any other variations involved in the specification and the appended claims intend to provide non-exclusive coverage, so that a procedure, method, system, product or device including a series of steps or units may also include any other elements not listed herein, or may include any inherent steps or units of the procedure, method, system, product or device. The expression "and/or" involved in the embodiments of the present disclosure may represent at least one of listed items. For example, "A and/or B" may represent that, there is only A, there are both A and B, and there is only B.

In the embodiments of the present disclosure, such expressions as "illustrative" and "for example" are only used to show examples or explanations. Any illustrative embodiment or scheme in the embodiments of the present disclosure shall not be construed as being superior over the other embodiment or scheme. Definitely, these words intend to exhibit relevant concepts in a concrete manner.

It should be appreciated that, the technology described in the context shall not be limited to a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system. The technology described in the context may be applied to the above-mentioned systems and radio technologies, or applied to the other systems and radio technologies. However, a New Radio (NR) system has been described illustratively hereinafter, and terms for the NR system have been used in most of the description, although these technologies may also be applied to the systems other than the NR system, e.g., a $6^{th}$-Generation (6G) communication system.

Figure 2:
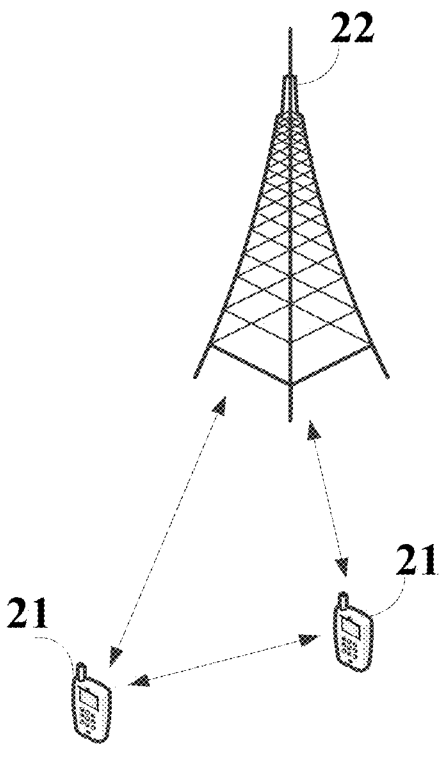
FIG. 2 is a schematic view showing an applicable wireless communication system according to one embodiment of the present disclosure.

FIG. 2 is a block diagram of an applicable wireless communication system according to one embodiment of the present disclosure. The wireless communication system includes a terminal 21 and a network side device 22. The terminal 21 may also be called as a User Equipment (UE), and it may be a terminal side device such as a mobile phone, a tablet personal computer, a laptop computer, a Personal Digital Assistant (PDA), a pocket personal computer, a netbook, an ultra-mobile personal computer (UMPC), a Mobile Internet Device (MID), a wearable device a Vehicle User Equipment (VUE) or a Pedestrian User Equipment (PUE). The wearable device includes bracelet, earphone or spectacles. It should be appreciated that, the specific type of the terminal 21 will not be particularly defined herein. The network side device 22 may be a base station or a core network. The base station is called as Node B, evolved Node B, access point, Base Transceiver Station (BTS), radio base station, radio transceiver, Basic Service Set (BSS), Extended Service Set (ESS), home node B, evolved home node B, WLAN access point, Wireless Fidelity (WiFi) node, Transmitting Receiving Point (TRP) or any other appropriate term in the field. The network side device shall not be limited to a specific technical term, as long as a same technical effect is achieved. It should be appreciated that, only the base station in the NR system is taken as an example in the embodiments of the present disclosure, but the specific type of the base station will not be particularly defined herein.

Figure 3:
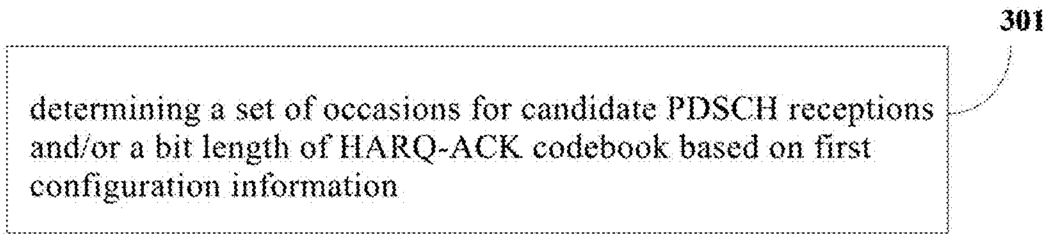
FIG. 3 is a flow chart of a method for creating a semi-static HARQ codebook according to one embodiment of the present disclosure.

As shown in FIG. 3, the present disclosure provides in some embodiments a method for creating a semi-static HARQ codebook for a terminal or a network side device, which includes Step 301 of determining a set of candidate PDSCH reception occasions and/or a bit length of an HARQ-ACK codebook based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is a set of HARQ feedback timing values K1 being associated with unicast PDSCH, the UE-specific PDSCH, UE-specific DCI, or DCI for scheduling the unicast PDSCH, and the second set of HARQ feedback timing values K1 is a set of HARQ feedback timing values K1 being associated with the multicast and/or broadcast PDSCH, the PDSCH common to the UEs, DCI common to the UEs, or DCI for scheduling the multicast PDSCH and/or broadcast PDSCH.

In some possible embodiments of the present disclosure, the UE-specific PDSCH is a PDSCH scheduled by DCI where CRC is scrambled with a UE-specific RNTI, the UE-specific DCI is DCI where the CRC is scrambled with the UE-specific RNTI, e.g., Cell RNTI (C-RNTI), the PDSCH common to the UEs is a PDSCH scheduled by the DCI where the CRC is scrambled with a common RNTI to UEs, and the DCI common to the UEs is DCI where the CRC is scrambled with the common RNTI to UEs, e.g., Group RNTI (G-RNTI).

In some possible embodiments of the present disclosure, the determining the set of occasions for candidate PDSCH receptions based on the first configuration information includes one of: a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table; a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

Figure 4:
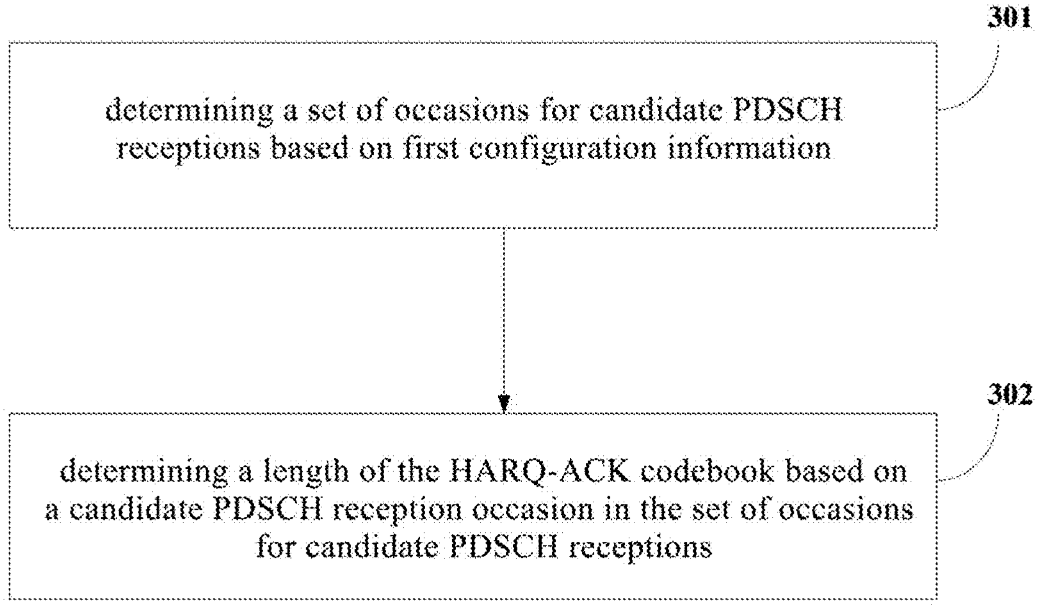
FIG. 4 is another schematic view showing the method for creating the semi-static HARQ codebook according to one embodiment of the present disclosure.

In another possible embodiment of the present disclosure, based on FIG. 3, as shown in FIG. 4, the method further includes Step 302 of determining a length of the HARQ-ACK codebook based on a candidate PDSCH reception occasion in the set of occasions for candidate PDSCH receptions.

For example, the bit length of the bit length of the HARQ-ACK codebook is determined based on the quantity of elements in the candidate PDSCH reception occasion in the set of occasions for candidate PDSCH receptions.

Figure 5:
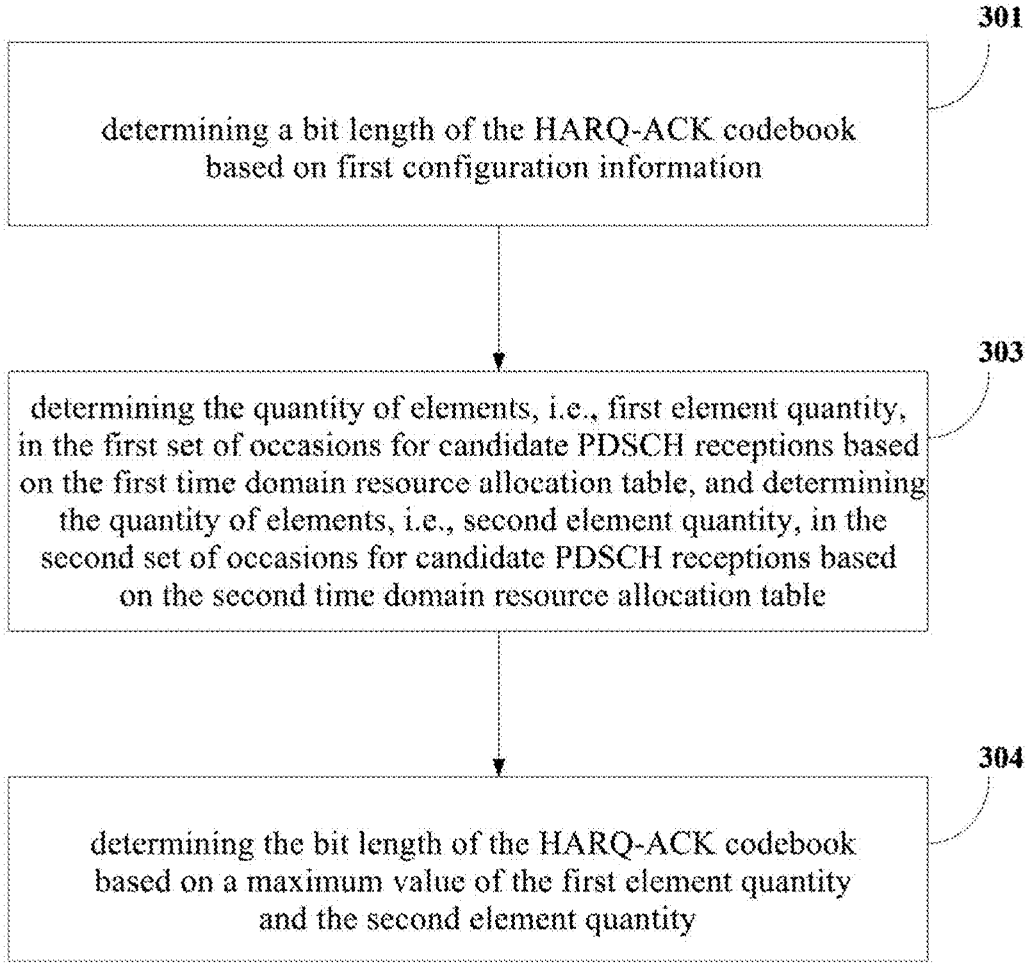
FIG. 5 is yet another schematic view showing the method for creating the semi-static HARQ codebook according to one embodiment of the present disclosure.

In yet another possible embodiment of the present disclosure, based on FIG. 3, as shown in FIG. 5, the method further includes: Step 303 of determining the quantity of elements, i.e., first element quantity, in the first set of occasions for candidate PDSCH receptions based on the first time domain resource allocation table, and determining the quantity of elements, i.e., second element quantity, in the second set of occasions for candidate PDSCH receptions based on the second time domain resource allocation table; and Step 304 of determining the bit length of the HARQ-ACK codebook based on a maximum value of the first element quantity and the second element quantity. The first element quantity is the quantity of elements in the first set of candidate PDSCH reception occasions determined based on the first time domain resource allocation table, and the second element quantity is the quantity of elements in the second set of candidate PDSCH reception occasions determined based on the second time domain resource allocation table.

Figure 6:
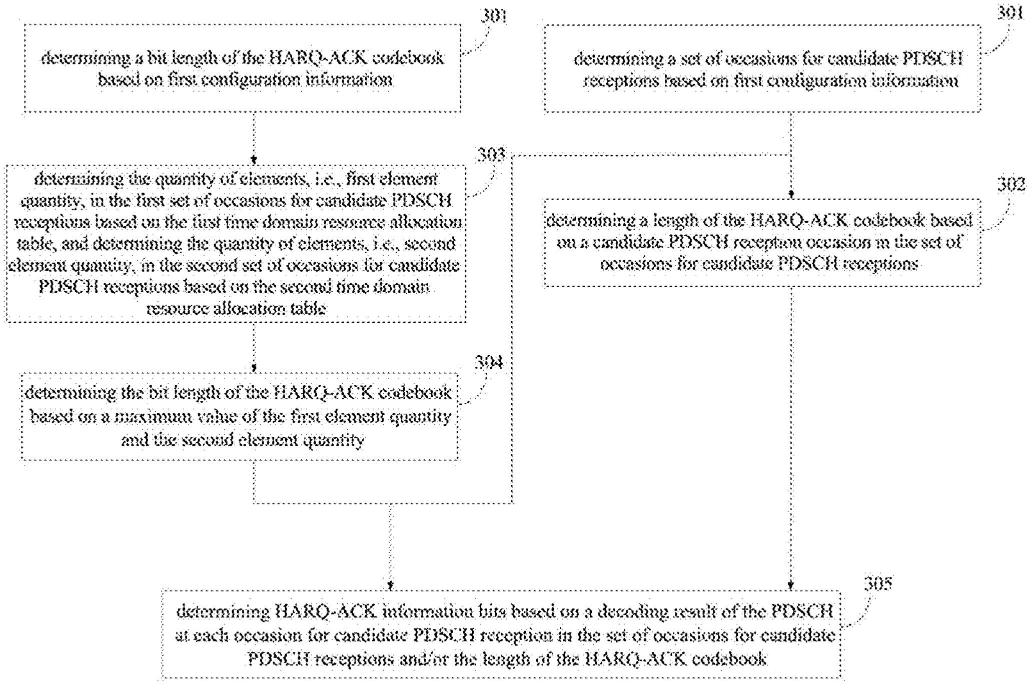
FIG. 6 is still yet another schematic view showing the method for creating the semi-static HARQ codebook according to one embodiment of the present disclosure.

In still yet another possible embodiment of the present disclosure, based on FIGS. 3, 4 and 5, as shown in FIG. 6, the method further includes Step 305 of determining HARQ-ACK information bits based on a decoding result of the PDSCH at each occasion for candidate PDSCH reception in the set of occasions for candidate PDSCH receptions and/or the length of the HARQ-ACK codebook.

In some embodiments of the present disclosure, in the case that the quantity of elements in the determined set of occasions for candidate PDSCH receptions is smaller than the maximum value of the first element quantity and the second element quantity, the corresponding HARQ-ACK information bits are determined based on the decoding result of the PDSCH at each occasion for candidate PDSCH reception in the set of occasions for candidate PDSCH receptions, and then NACK bits are added until a bit length is equal to the bit length of the HARQ-ACK codebook; or in the case that the quantity of elements in the determined set of occasions for candidate PDSCH receptions is equal to the maximum value of the first element quantity and the second element quantity, the corresponding HARQ-ACK information bits are determined based on the decoding result of the PDSCH at each occasion for candidate PDSCH reception in the set of occasions for candidate PDSCH receptions.

In the embodiments of the present disclosure, the quantity of occasions for candidate PDSCH receptions in the set of occasions for candidate PDSCH receptions is determined based on a type of the time domain resource allocation table, so as to save the HARQ-ACK information bits.

The present disclosure will be described hereinafter in conjunction with a first scenario and a second scenario.

First scenario: the UE supports to receive or process the PDSCH for the TDD unicast service and the PDSCH for the multicast/broadcast service within one slot.

Step 1: the UE determines a set of PDSCH reception occasions based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is the set of HARQ feedback timing values associated with unicast PDSCH, the UE-specific PDSCH, UE-specific DCI, or DCI for scheduling the unicast PDSCH, and the second set of HARQ feedback timing values K1 is the set of HARQ feedback timing values associated with the multicast and/or broadcast PDSCH, the PDSCH common to the UEs, DCI common to the UEs, or DCI for scheduling the multicast PDSCH and/or broadcast PDSCH.

The UE-specific PDSCH is a PDSCH scheduled by DCI where CRC is scrambled with a UE-specific RNTI, the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

For example, the UE-specific RNTI is a C-RNTI, a Modulation and Coding Scheme C-RNTI (MCS-C-RNTI), or a Configured Scheduling RNTI (CS-RNTI). The common RNTI to UEs is a G-RNTI.

For a specific slot, when both the first time domain resource allocation table and the second time domain resource allocation table are activated or available, or for a specific K1, when it is included both in the first set of HARQ feedback timing values K1 and the second set of HARQ feedback timing values K1, the UE determines the set of occasions for candidate PDSCH receptions based on the union of row indexes of the first time domain resource allocation table and the second time domain resource allocation table.

For a specific slot, when both the first time domain resource allocation table and the second time domain resource allocation table are activated or available, or for a specific K1, when it is only included in the first set of HARQ feedback timing values K1 or the second set of HARQ feedback timing values K1, the UE determines the set of occasions for candidate PDSCH receptions based on the activated or available time domain resource allocation table or a set of rows in the time domain resource allocation table associated with K1.

Step 2: the UE determines the HARQ-ACK information bits based on a candidate PDSCH reception occasion in the set of occasions for candidate PDSCH receptions.

The UE determines the quantity of occasions for candidate PDSCH receptions in the set of occasions for candidate PDSCH receptions based on a type of the time domain resource allocation table, so as to save the HARQ-ACK information bits.

Example 1-1

Figure 7:
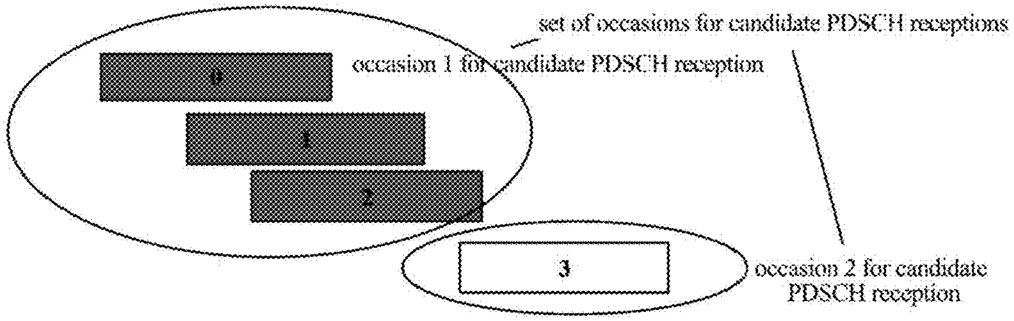
FIGS. 7 to 14 are schematic views showing the creation of the semi-static HARQ codebook according to one embodiment of the present disclosure.

As shown in FIG. 7, rows 0, 1 and 2 are rows in a first PDSCH time domain resource allocation table (which belongs to the first time domain resource allocation table), and row 3 is a row in a second PDSCH time domain resource allocation table (which belongs to the second time domain resource allocation table). Two sets of HARQ feedback timing values K1 are configured by the network side device for the UE, where a first set of HARQ feedback timing values K1 associated with the first PDSCH time domain resource allocation table or DCI for scheduling the first PDSCH time domain resource allocation table, and the second set of HARQ feedback timing values K1 associated with the second PDSCH time domain resource allocation table or DCI for scheduling the second PDSCH time domain resource allocation table.

For a certain slot, the first PDSCH time domain resource allocation table and the second PDSCH time domain resource allocation table are activated or available, or for a certain K1, it is included in both the first set of HARQ feedback timing values K1 and the second set of HARQ feedback timing values K1.

The UE determines the set of occasions for candidate PDSCH receptions based on rows 0, 1 and 2 in the first PDSCH time domain resource allocation table and row 3 in the second PDSCH time domain resource allocation table. The set of occasions for candidate PDSCH receptions include two candidate PDSCH reception occasions, i.e., a candidate PDSCH reception occasion 1 and a candidate PDSCH reception occasion 2. The candidate PDSCH reception occasion 1 corresponds to rows 0, 1 and 2 in the first PDSCH time domain resource allocation table, and the candidate PDSCH reception occasion 2 corresponds to row 3 in the second PDSCH time domain resource allocation table.

Example 1-2

Figure 8:
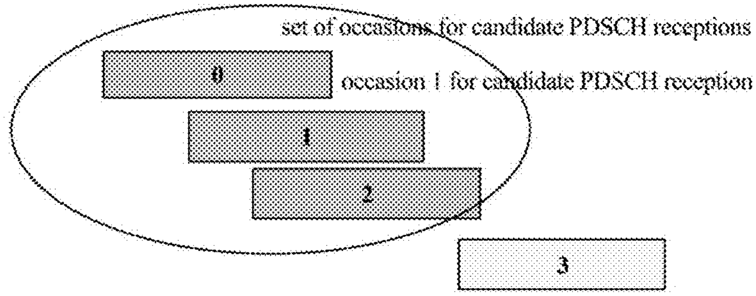

As shown in FIG. 8, for a certain slot, when only the first PDSCH time domain resource allocation table is activated or available, or for a certain K1, when it is only included in the first set of HARQ feedback timing values K1, the UE determines the set of occasions for candidate PDSCH receptions only based on rows 0, 1 and 2 in the first PDSCH time domain resource allocation table. The set of occasions for candidate PDSCH receptions include the candidate PDSCH resource occasion 1 corresponding to rows 0, 1 and 2 in the first PDSCH time domain resource allocation table.

Example 1-3

Figure 9:
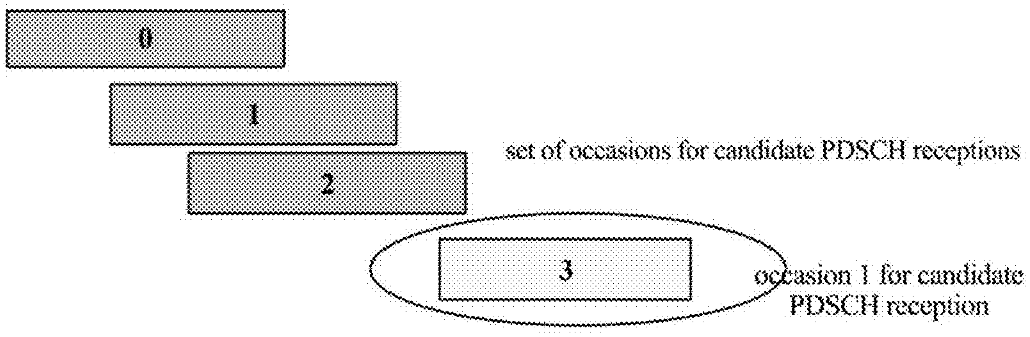

As shown in FIG. 9, for a certain slot, when only the second PDSCH time domain resource allocation table is activated or available, or for a certain K1, when it is only included in the second set of HARQ feedback timing values K1, the UE determines the set of occasions for candidate PDSCH receptions only based on row 3 in the second PDSCH time domain resource allocation table. The set of occasions for candidate PDSCH receptions include the candidate PDSCH resource occasion 1 corresponding to row 3 in the second PDSCH time domain resource allocation table.

In Examples 1-1, 1-2 and 1-3, the UE determines the quantity of occasions for candidate PDSCH receptions in the set of occasions for candidate PDSCH receptions based on the type of the time domain resource allocation table, so as to reduce the HARQ-ACK information bits.

Second scenario: the UE does not support to receive or process the PDSCH for the TDD unicast service and the PDSCH for the multicast/broadcast service within one slot.

Step 1: the UE determines a set of PDSCH reception occasions based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is a set of HARQ feedback timing values K1 being associated with unicast PDSCH, the UE-specific PDSCH, UE-specific DCI, or DCI for scheduling the unicast PDSCH, and the second set of HARQ feedback timing values K1 is a set of HARQ feedback timing values K1 being associated with the multicast and/or broadcast PDSCH, the PDSCH common to the UEs, DCI common to the UEs, or DCI for scheduling the multicast PDSCH and/or broadcast PDSCH.

The UE-specific PDSCH is a PDSCH scheduled by DCI where CRC is scrambled with a UE-specific RNTI, the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

For example, the UE-specific RNTI is a C-RNTI, a Modulation and Coding Scheme C-RNTI (MCS-C-RNTI), or a Configured Scheduling RNTI (CS-RNTI). The common RNTI to UEs is a G-RNTI.

For a specific slot, when only one of the first time domain resource allocation table and the second time domain resource allocation table is activated or available, or for a specific K1, when it is only included in the first set of HARQ feedback timing values K1 or the second set of HARQ feedback timing values K1, the UE determines the set of occasions for candidate PDSCH receptions based on the activated or available time domain resource allocation table, or a set of rows in the time domain resource allocation table associated with K1.

For a specific slot, when both the first time domain resource allocation table and the second time domain resource allocation table are activated or available, or for a specific K1, when it is included in both the first set of HARQ feedback timing values K1 and the second set of HARQ feedback timing values K1, the UE determines the set of rows in the first time domain resource allocation table or the second time domain resource allocation table based on the type of the received PDSCH or the type of the DCI for scheduling the PDSCH within the slot, so as to determine the set of occasions for candidate PDSCH receptions.

Step 2: the UE determines a length of the HARQ-ACK codebook.

Step 3: the UE determines the HARQ-ACK information bits based on a candidate PDSCH reception occasion in the set of occasions for candidate PDSCH receptions.

Scenario 2-1: for a specific slot, when only one of the first time domain resource allocation table and the second time domain resource allocation table is activated or available, or for a specific K1, it is only included in the first set of HARQ feedback timing values K1 or the second set of HARQ feedback timing values K1, the UE determines the length of the corresponding HARQ-ACK codebook and the HARQ-ACK information bits based on a candidate PDSCH reception occasion in the determined set of candidate PDSCI reception occasions.

The UE determines the quantity of occasions for candidate PDSCH receptions in the set of occasions for candidate PDSCH receptions based on the type of the time domain resource allocation table, so as to save the HARQ-ACK information bits.

Example 2-1

Figure 10:
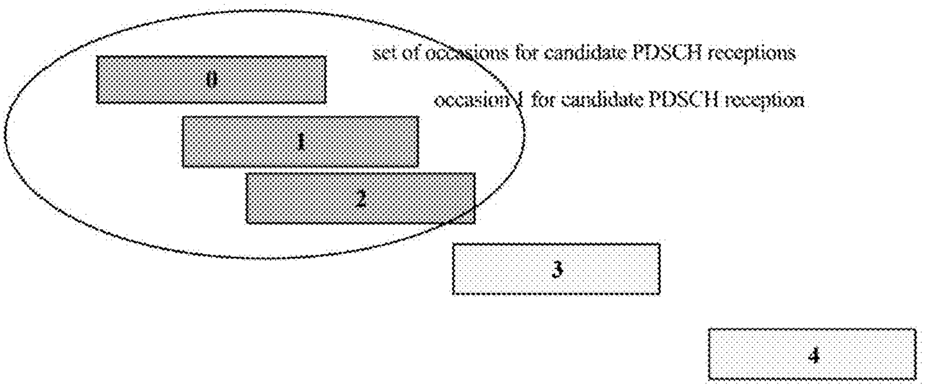
Figure 11:
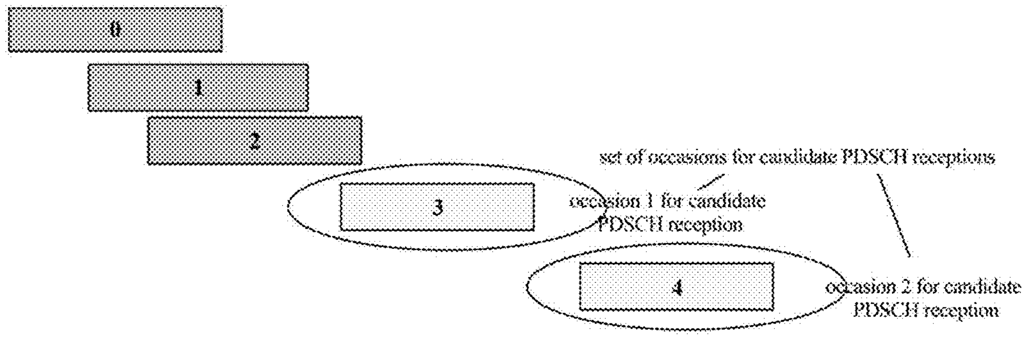

As shown in FIGS. 10 and 11, rows 0, 1 and 2 are rows in a first PDSCH time domain resource allocation table (which belongs to the first time domain resource allocation table), and rows 3 and 4 are rows in a second PDSCH time domain resource allocation table (which belongs to the second time domain resource allocation table). The UE does not support to receive the PDSCH for the TDD unicast service and the PDSCH for the multicast/broadcast service within one slot.

For a certain slot, when only the first PDSCH time domain resource allocation table is activated or available, or for a certain K1, it is only included in the first set of HARQ feedback timing values K1, the UE determines the set of occasions for candidate PDSCH receptions only based on rows 0, 1 and 2, and the set of occasions for candidate PDSCH receptions includes a candidate PDSCH reception occasion 1.

For a certain slot, when only the second PDSCH time domain resource allocation table is activated or available, or for a certain K1, it is only included in the second set of HARQ feedback timing values K1, the UE determines the set of occasions for candidate PDSCH receptions only based on rows 3 and 4, and the set of occasions for candidate PDSCH receptions includes candidate PDSCH reception occasions 1 and 2.

The UE determines the quantity of bits for the HARQ feedback based on the determined set of candidate PDSCH reception occasions.

Scenario 2-2: for a specific slot, the first time domain resource allocation table and the second time domain resource allocation table are activated or available, or for a specific K1, it is included in both the first set of HARQ feedback timing values K1 and the second set of HARQ feedback timing values K1.

The UE determines the quantity of elements, i.e., first element quantity, in the first set of occasions for candidate PDSCH receptions based on the first time domain resource allocation table, and determining the quantity of elements, i.e., second element quantity, in the second set of occasions for candidate PDSCH receptions based on the second time domain resource allocation table. The first element quantity is the quantity of different candidate PDSCH reception occasions in the first set of candidate PDSCH reception occasions determined based on the first time domain resource allocation table, and the second element quantity is the quantity of different candidate PDSCH reception occasions in the second set of candidate PDSCH reception occasions determined based on the second time domain resource allocation table.

The UE determines a bit length N of the HARQ-ACK codebook based on a maximum value M of the first element quantity and the second element quantity.

When the quantity of elements in the determined set of occasions for candidate PDSCH receptions is smaller than M, the corresponding HARQ-ACK information bits are determined based on a candidate PDSCH reception occasion in the set of occasions for candidate PDSCH receptions, and then NACK bits are added until the bit length is equal to N.

When the quantity of elements in the determined set of occasions for candidate PDSCH receptions is equal to M, the corresponding HARQ-ACK information bits are determined based on a candidate PDSCH reception occasion in the set of occasions for candidate PDSCH receptions.

The UE determines the quantity of NACK information bits based on the larger quantity of candidate PDSCH reception occasions, so as to prevent the base station and the UE from understanding the HARQ-ACK information bits non-uniformly when the PDSCH is not received correctly by the UE.

Example 2-2

Figure 12:
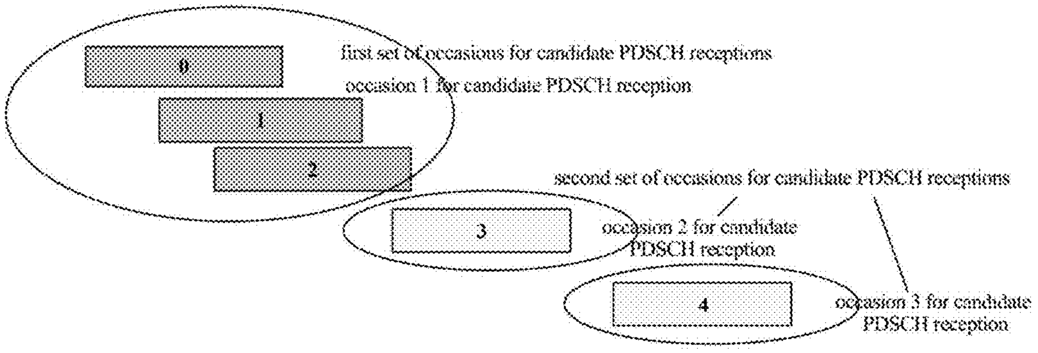

As shown in FIG. 12, rows 0, 1 and 2 are rows in a first PDSCH time domain resource allocation table (which belongs to the first time domain resource allocation table), and rows 3 and 4 are rows in a second PDSCH time domain resource allocation table (which belongs to the second time domain resource allocation table). The UE does not support to receive the PDSCH for the TDD unicast service and the PDSCH for the multicast/broadcast service within one slot.

For a certain slot, the first PDSCH time domain resource allocation table and the second PDSCH time domain resource allocation table are activated or available, or for a certain K1, it is included in both the first set of HARQ feedback timing values K1 and the second set of HARQ feedback timing values K1. The UE determines the first set of candidate PDSCH reception occasions based on the first PDSCH time domain resource allocation table, and the first set of candidate PDSCH reception occasions include a candidate PDSCH reception occasion 1, i.e., the element quantity in the first set of candidate PDSCH reception occasions is 1. The UE determines the second set of candidate PDSCH reception occasions based on the second PDSCH time domain resource allocation table, and the second set of candidate PDSCH reception occasions include candidate PDSCH reception occasions 2 and 3, i.e., the second element quantity in the second set of candidate PDSCH reception occasions is 2. Because 1 is smaller than 2, the bit length of the HARQ-ACK codebook within this slot is determined based on the second element quantity, and it includes two bits.

Figure 13:
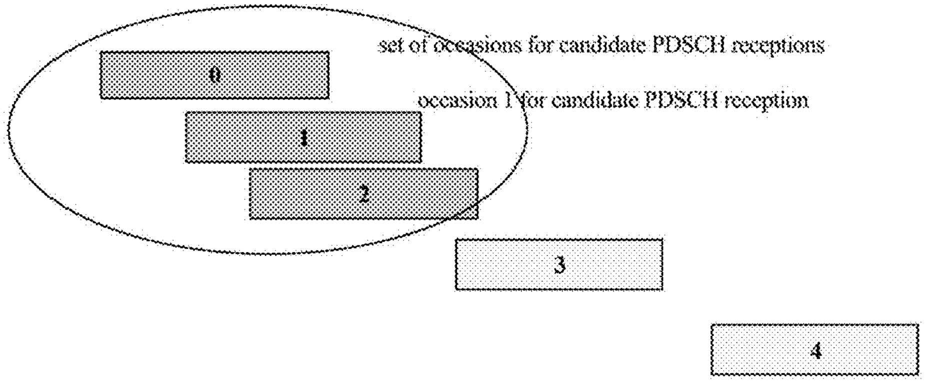

As shown in FIG. 13, when the PDSCH correctly received by the UE within the slot is a PDSCH to which the first PDSCH time domain resource allocation table is applied, or a PDSCH for the unicast service, or a UE-specific PDSCH, or a PDSCH scheduled by the DCI where the CRC is scrambled with the UE-specific RNTI, the UE determines the set of occasions for candidate PDSCH receptions based on the first PDSCH time domain resource allocation table. The set of occasions for candidate PDSCH receptions include a candidate PDSCH reception occasion 1, and the UE generates 1-bit HARQ-ACK information. Then, 1-bit NACK information is added after the 1-bit HARQ-ACK information, so as to obtain the 2-bit HARQ-ACK information.

Figure 14:
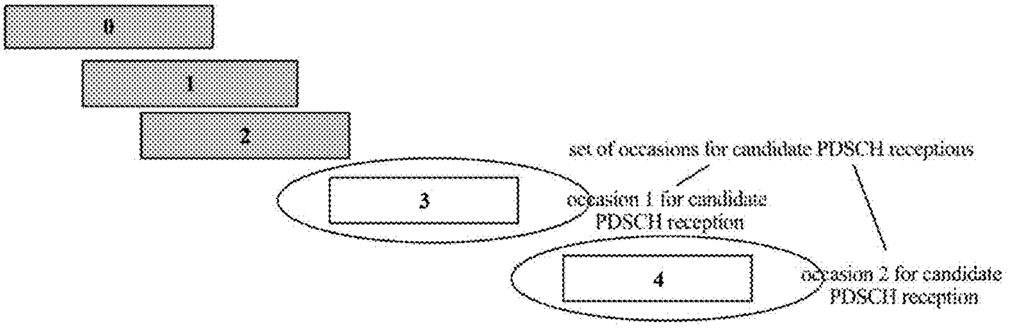

As shown in FIG. 14, when the PDSCH correctly received by the UE within the slot is a PDSCH to which the second PDSCH time domain resource allocation table is applied, or a PDSCH for the multicast/broadcast service, or a PDSCH shared by multiple UEs, or a PDSCH scheduled by the DCI where the CRC is scrambled with the common RNTI to UEs, the UE determines the set of occasions for candidate PDSCH receptions based on the second PDSCH time domain resource allocation table. The set of occasions for candidate PDSCH receptions include candidate PDSCH reception occasions 1 and 2, and the UE generates 2-bit HARQ-ACK information.

When the UE fails to detect any DCI within the slot, it generates 2-bit NACK information.

According to the embodiments of the present disclosure, the UE determines the quantity of NACK information bits based on the larger quantity of candidate PDSCH reception occasions, so as to prevent the base station and the UE from understanding the HARQ-ACK information bits non-uniformly when the PDSCH is not received correctly by the UE.

Figure 15:
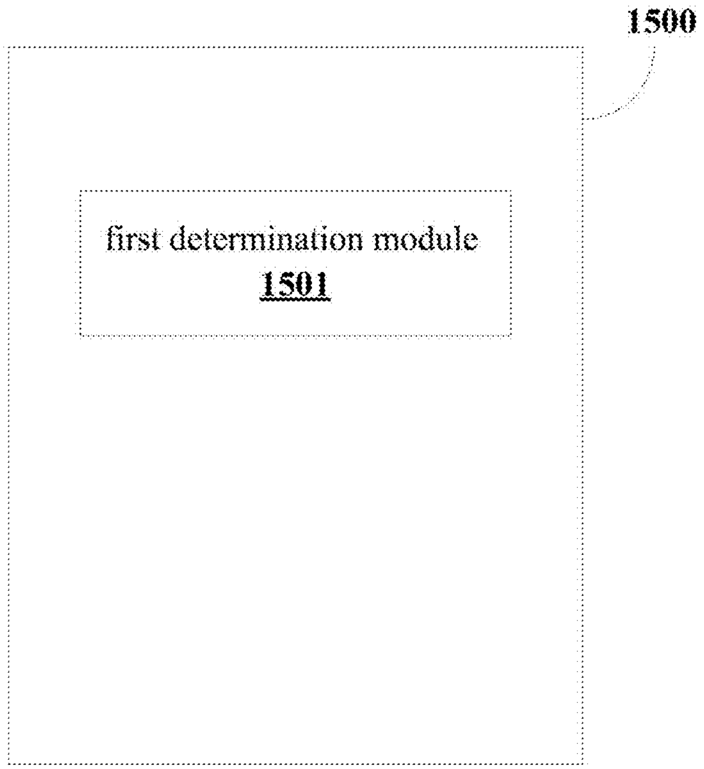
FIG. 15 is a schematic view showing a device for creating a semi-static HARQ codebook according to one embodiment of the present disclosure.

As shown in FIG. 15, the present disclosure further provides in some embodiments a device 1500 for creating a semi-static HARQ codebook for a UE or network side device, which includes a first determination module 1501 configured to determine a set of candidate PDSCH reception occasions and/or a bit length of an HARQ-ACK codebook based on first configuration information. The first configuration information includes one or more of a first time domain resource allocation table, a second time domain resource allocation table, a first set of HARQ feedback timing values K1, or a second set of HARQ feedback timing values K1. The first time domain resource allocation table is a time domain resource allocation table for a PDSCH for unicast service or a UE-specific PDSCH, the second time domain resource allocation table is a time domain resource allocation table for multicast PDSCH and/or broadcast PDSCH, or PDSCH common to UEs, the first set of HARQ feedback timing values K1 is a set of HARQ feedback timing values K1 being associated with unicast PDSCH, the UE-specific PDSCH, UE-specific DCI, or DCI for scheduling the unicast PDSCH, and the second set of HARQ feedback timing values K1 is a set of HARQ feedback timing values K1 being associated with the multicast and/or broadcast PDSCH, the PDSCH common to the UEs, DCI common to the UEs, or DCI for scheduling the multicast PDSCH and/or broadcast PDSCH.

In some possible embodiments of the present disclosure, the UE-specific PDSCH is a PDSCH scheduled by DCI where CRC is scrambled with a UE-specific RNTI, the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

In some possible embodiments of the present disclosure, the first determination module 1501 is further configured to perform one of: a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included both the first set of HARQ feedback timing values K1 and the second set of HARQ feedback timing values K1, determining the set of occasions for candidate PDSCH receptions based on the union of row indexes of the first time domain resource allocation table and the second time domain resource allocation table; a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

In some possible embodiments of the present disclosure, the first determination module 1501 is further configured to determine the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

In some possible embodiments of the present disclosure, the device further includes a second determination module configured to determine the bit length of the HARQ-ACK codebook based on the quantity of occasions for candidate PDSCH receptions in the set of occasions for candidate PDSCH receptions.

In some possible embodiments of the present disclosure, the device further includes a third determination module configured to determine HARQ-ACK information bits based on a decoding result of the PDSCH at each occasion for candidate PDSCH reception in the set of occasions for candidate PDSCH receptions and/or a length of the HARQ-ACK codebook.

In some possible embodiments of the present disclosure, the third determination module is further configured to: in the case that the quantity of elements in the determined set of occasions for candidate PDSCH receptions is smaller than the maximum value of the first element quantity and the second element quantity, determine the corresponding HARQ-ACK information bits based on the decoding result of the PDSCH at each occasion for candidate PDSCH reception in the set of occasions for candidate PDSCH receptions, and add NACK bits until a bit length is equal to the bit length of the HARQ-ACK codebook; or in the case that the quantity of elements in the determined set of occasions for candidate PDSCH receptions is equal to the maximum value of the first element quantity and the second element quantity, determine the corresponding HARQ-ACK information bits based on the decoding result of the PDSCH at each occasion for candidate PDSCH reception in the set of occasions for candidate PDSCH receptions.

The device in the embodiments of the present disclosure is used to implement the method as shown in FIGS. 2 to 6 with a same technical effect, which will thus not be particularly defined herein.

Figure 16:
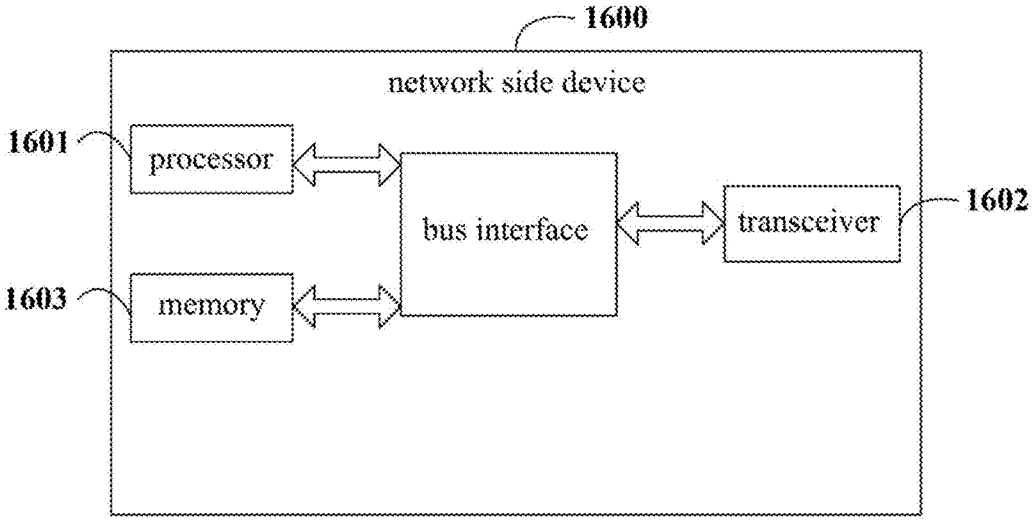
FIG. 16 is a schematic view showing a network side device according to one embodiment of the present disclosure.

As shown in FIG. 16, the present disclosure further provides in some embodiments a network side device 1600, which includes a processor 1601, a transceiver 1602, a memory 1603 and a bus interface. The network side device 1600 further includes a program stored in the memory 1603 and executed by the processor 1601. The program is executed by the processor 1601 so as to implement the steps as shown in FIGS. 2 to 6.

In FIG. 16, bus architecture may include a number of buses and bridges connected to each other, so as to connect various circuits for one or more processors 1601 and one or more memories 1603. In addition, as is known in the art, the bus architecture may be used to connect any other circuits, such as a circuit for a peripheral device, a circuit for a voltage stabilizer and a power management circuit. The bus interface may be provided, and the transceiver 1602 may consist of multiple elements, i.e., a transmitter and a receiver for communication with any other devices over a transmission medium.

The processor 1601 may take charge of managing the bus architecture as well as general processings. The memory 1603 may store therein data for the operation of the processor 1601.

The network side device in the embodiments of the present disclosure is used to implement the method as shown in FIGS. 2 to 6 with a same technical effect, which will thus not be particularly defined herein.

Figure 17:
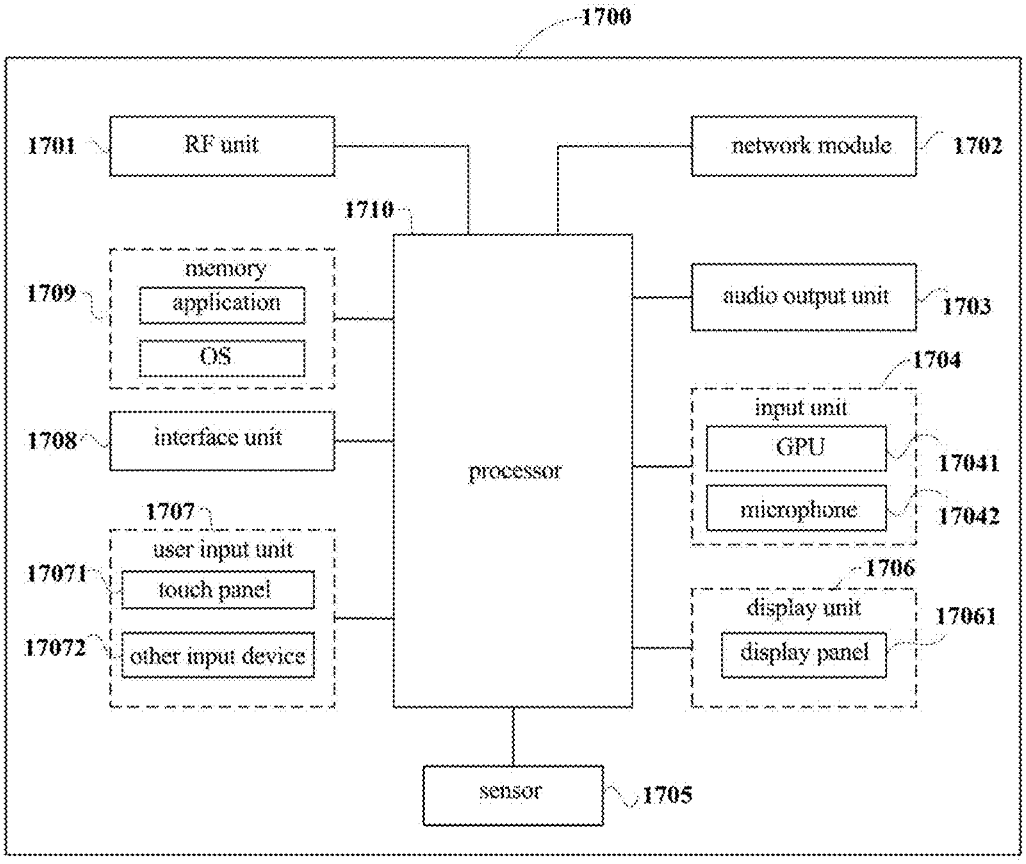
FIG. 17 is a schematic view showing a UE according to one embodiment of the present disclosure.

As shown in FIG. 17, the present disclosure further provides in some embodiments a UE 1700 which includes, but not limited to, a Radio Frequency (RF) unit 1701, a network module 1702, an audio output unit 1703, an input unit 1704, a sensor 1705, a display unit 1706, a user input unit 1707, an interface unit 1708, a memory 1709 and a processor 1710.

It should be appreciated that, the UE 1700 may further include a power source (e.g., battery) for providing power to each member. The power source is logically coupled to the processor 1710 through a power source management system, so as to achieve such functions as charging/discharging management and power consumption management through the power source management system. The structure in FIG. 17 shall not be construed as limiting the UE. The UE may include more or fewer members, or some members may be combined, or the members may be arranged in different modes.

It should be appreciated that, in the embodiments of the present disclosure, the input unit 1704 includes a Graphics Processing Unit (GPU) 17041 and a microphone 17042. The GPU 17041 is configured to process image data of a static image or video acquired by an image collection unit (e.g., a camera) in a video capturing mode or an image capturing mode. The display unit 1706 includes a display panel 17061, e.g., a liquid crystal display panel or an organic light-emitting diode display panel. The user input unit 1707 includes a touch panel 17071 and other input device 17072. The touch panel 17071 is also called as a touch screen, and it includes a touch detection unit and a touch controller. The other input device 17072 may include, but not limited to, a physical keyboard, a functional button (e.g., a volume control button or an on/off button), a trackball, a mouse, and a joystick, which will not be particularly defined herein.

In the embodiments of the present disclosure, the RF unit 1701 may, upon the receipt of downlink data from a network side device, transmit the downlink data to the processor 1710 for subsequent treatment. In addition, the RF unit 1701 may transmit uplink data to the network side device. Usually, the RF unit 1701 may include, but not limited to, an antenna, at least one amplifier, a transceiver, a coupler, a low-noise amplifier and a duplexer.

The memory 1709 is configured to store therein a software program or instruction and various data. It may mainly include a program or instruction storage area and a data storage area. An operating system (OS) and at least one program or instruction for the functions (e.g., an audio/image playing function) may be stored in the program or instruction storage area. In addition, the memory 1709 may include a high-speed random access memory (RAM), or a non-volatile memory, e.g., Read-Only Memory (ROM), Programmable ROM (PROM), Erasable PROM (EPROM), Electrically EPROM (EEPROM) or flash memory. For example, the memory includes at least one magnetic disk, a flash memory, or any other volatile solid state memory.

The processor 1710 may include one or more processing units. In some possible embodiments of the present disclosure, an application processor and a modem may be integrated into the processor 1710. The application processor is mainly configured to process the operating system, a user interface and the application. The modem is mainly configured to process wireless communication, e.g., a baseband processor. It should be appreciated that, the modem may also not be integrated into the processor 1710.

The UE in the embodiments of the present disclosure is used to implement the method as shown in FIGS. 2 to 6 with a same technical effect, which will not be particularly defined herein.

The present disclosure further provides in some embodiments a readable storage medium storing therein a program or instruction. The program or instruction is executed by a processor so as to implement the method as shown in FIGS. 2 to 6 with a same technical effect, which will not be particularly defined herein.

The processor is a processor in the above-mentioned UE. The readable storage medium includes a computer-readable storage medium, e.g., an ROM, an RAM, a magnetic disk or an optical disk.

The steps of the methods or algorithm described in conjunction with the contents mentioned hereinabove may be implemented through hardware, or implemented by a processor executing instructions. The instructions may consist of corresponding modules stored in a Random Access Memory (RAM), a flash memory, a Read-Only Memory (ROM), an Erasable Programmable Read-Only Memory (EPROM), an Electrically Erasable Programmable Read-Only Memory (EEPROM), a register, a hard disk, a mobile hard disk, a read-only optic disk, or any other known storage medium. Illustratively, the storage medium may be coupled to the processor, so that the processor is capable of reading information from the storage medium and writing information into the storage medium. Of course, the storage medium may be a component of the processor. The processor and the storage medium may be located in an Application Specific Integrated Circuit (ASIC). In addition, the ASIC may be located in an interface device of a core network. Of course, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for generating semi-static Hybrid Automatic Repeat reQuest (HARQ) codebook, comprising determining at least one of a set of occasions for candidate Physical Downlink Shared Channel (PDSCH) receptions or a bit length of an HARQ Acknowledgement (HARQ-ACK) codebook based on first configuration information, wherein the first configuration information comprises:

at least one of a first time domain resource allocation table and a first set of HARQ feedback timing values K1; and at least one of a second time domain resource allocation table and a second set of HARQ feedback timing values K1, wherein the HARQ feedback timing value K1 is a non-negative integer;

wherein the first time domain resource allocation table is a time domain resource allocation table for unicast PDSCH or User Equipment (UE)-specific PDSCH;

the second time domain resource allocation table is a time domain resource allocation table for at least one of multicast PDSCH or broadcast PDSCH; or PDSCH common to UEs;

the first set of HARQ feedback timing values K1 is the set of HARQ feedback timing values associated with unicast PDSCH, the UE-specific PDSCH, UE-specific Downlink Control Information (DCI), or DCI for scheduling the unicast PDSCH; and the second set of HARQ feedback timing values K1 is the set of HARQ feedback timing values associated with at least one of the multicast PDSCH or broadcast PDSCH, the PDSCH common to the UEs, DCI common to the UEs, or DCI for scheduling at least one of the multicast PDSCH or broadcast PDSCH.

2. The method according to claim 1, wherein the UE-specific PDSCH is a PDSCH scheduled by DCI where Cyclic Redundancy Check (CRC) is scrambled with a UE-specific Radio Network Temporary Identity (RNTI), the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

3. The method according to claim 1, wherein the determining the set of occasions for candidate PDSCH receptions based on the first configuration information comprises one of:

a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table;

a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

4. The method according to claim 3, further comprising determining HARQ-ACK information bits based on at least one of a decoding result of the PDSCH at each occasion for candidate PDSCH reception in the set of occasions for candidate PDSCH receptions or a length of the HARQ-ACK codebook.

5. The method according to claim 4, wherein the determining the HARQ-ACK information bits based on at least one of the decoding result of the PDSCH at each occasion for candidate PDSCH reception in the set of occasions for candidate PDSCH receptions or the length of the HARQ-ACK codebook comprises:

in the case that the quantity of elements in the determined set of occasions for candidate PDSCH receptions is smaller than the maximum value of the first element quantity and the second element quantity, determining the corresponding HARQ-ACK information bits based on the decoding result of the PDSCH at each occasion for candidate PDSCH reception in the set of occasions for candidate PDSCH receptions, and adding Negative ACK (NACK) bits until a bit length is equal to the bit length of the HARQ-ACK codebook; or in the case that the quantity of elements in the determined set of occasions for candidate PDSCH receptions is equal to the maximum value of the first element quantity and the second element quantity, determining the corresponding HARQ-ACK information bits based on the decoding result of the PDSCH at each occasion for candidate PDSCH reception in the set of occasions for candidate PDSCH receptions.

6. The method according to claim 1, wherein the determining the bit length of the HARQ-ACK codebook based on the first configuration information comprises determining the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

7. The method according to claim 1, wherein subsequent to the determining the set of occasions for candidate PDSCH receptions based on the first configuration information, the method further comprises determining the bit length of the HARQ-ACK codebook based on the quantity of occasions for candidate PDSCH receptions in the set of occasions for candidate PDSCH receptions.

8. A User Equipment (UE), comprising a processor, a memory, and a program stored in the memory and executed by the processor, wherein the program is executed by the processor so as to implement the steps of a method for generating semi-static Hybrid Automatic Repeat reQuest (HARQ) codebook, the method comprising:

determining at least one of a set of occasions for candidate Physical Downlink Shared Channel (PDSCH) receptions or a bit length of an HARQ Acknowledgement (HARQ-ACK) codebook based on first configuration information, wherein the first configuration information comprises:

at least one of a first time domain resource allocation table and a first set of HARQ feedback timing values K1; and at least one of a second time domain resource allocation table and a second set of HARQ feedback timing values K1, wherein the HARQ feedback timing value K1 is a non-negative integer;

wherein the first time domain resource allocation table is a time domain resource allocation table for unicast PDSCH or User Equipment (UE)-specific PDSCH;

the second time domain resource allocation table is a time domain resource allocation table for at least one of multicast PDSCH or broadcast PDSCH; or PDSCH common to UEs;

the first set of HARQ feedback timing values K1 is the set of HARQ feedback timing values associated with unicast PDSCH, the UE-specific PDSCH, UE-specific Downlink Control Information (DCI), or DCI for scheduling the unicast PDSCH; and the second set of HARQ feedback timing values K1 is the set of HARQ feedback timing values associated with at least one of the multicast PDSCH or broadcast PDSCH, the PDSCH common to the UEs, DCI common to the UEs, or DCI for scheduling at least one of the multicast PDSCH or broadcast PDSCH.

9. The UE according to claim 8, wherein the UE-specific PDSCH is a PDSCH scheduled by DCI where Cyclic Redundancy Check (CRC) is scrambled with a UE-specific Radio Network Temporary Identity (RNTI), the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

10. The UE according to claim 8, wherein the determining the set of occasions for candidate PDSCH receptions based on the first configuration information comprises one of:

a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table;

a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

11. The UE according to claim 10, wherein the method further comprises determining HARQ-ACK information bits based on at least one of a decoding result of the PDSCH at each occasion for candidate PDSCH reception in the set of occasions for candidate PDSCH receptions or a length of the HARQ-ACK codebook.

12. The UE according to claim 11, wherein the determining the HARQ-ACK information bits based on at least one of the decoding result of the PDSCH at each occasion for candidate PDSCH reception in the set of occasions for candidate PDSCH receptions or the length of the HARQ-ACK codebook comprises:

in the case that the quantity of elements in the determined set of occasions for candidate PDSCH receptions is smaller than the maximum value of the first element quantity and the second element quantity, determining the corresponding HARQ-ACK information bits based on the decoding result of the PDSCH at each occasion for candidate PDSCH reception in the set of occasions for candidate PDSCH receptions, and adding Negative ACK (NACK) bits until a bit length is equal to the bit length of the HARQ-ACK codebook; or in the case that the quantity of elements in the determined set of occasions for candidate PDSCH receptions is equal to the maximum value of the first element quantity and the second element quantity, determining the corresponding HARQ-ACK information bits based on the decoding result of the PDSCH at each occasion for candidate PDSCH reception in the set of occasions for candidate PDSCH receptions.

13. The UE according to claim 8, wherein the determining the bit length of the HARQ-ACK codebook based on the first configuration information comprises determining the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

14. The UE according to claim 8, wherein subsequent to the determining the set of occasions for candidate PDSCH receptions based on the first configuration information, the method further comprises determining the bit length of the HARQ-ACK codebook based on the quantity of occasions for candidate PDSCH receptions in the set of occasions for candidate PDSCH receptions.

15. A network side device, comprising a processor, a memory, and a program stored in the memory and executed by the processor, wherein the program is executed by the processor so as to implement the steps of a method for generating semi-static Hybrid Automatic Repeat reQuest (HARQ) codebook, the method comprising:

determining at least one of a set of occasions for candidate Physical Downlink Shared Channel (PDSCH) receptions or a bit length of an HARQ Acknowledgement (HARQ-ACK) codebook based on first configuration information, wherein the first configuration information comprises:

at least one of a first time domain resource allocation table and a first set of HARQ feedback timing values K1; and at least one of a second time domain resource allocation table and a second set of HARQ feedback timing values K1, wherein the HARQ feedback timing value K1 is a non-negative integer;

wherein the first time domain resource allocation table is a time domain resource allocation table for unicast PDSCH or User Equipment (UE)-specific PDSCH;

the second time domain resource allocation table is a time domain resource allocation table for at least one of multicast PDSCH or broadcast PDSCH; or PDSCH common to UEs;

the first set of HARQ feedback timing values K1 is the set of HARQ feedback timing values associated with unicast PDSCH, the UE-specific PDSCH, UE-specific Downlink Control Information (DCI), or DCI for scheduling the unicast PDSCH; and the second set of HARQ feedback timing values K1 is the set of HARQ feedback timing values associated with at least one of the multicast PDSCH or broadcast PDSCH, the PDSCH common to the UEs, DCI common to the UEs, or DCI for scheduling at least one of the multicast PDSCH or broadcast PDSCH.

16. The network side device according to claim 15, wherein the UE-specific PDSCH is a PDSCH scheduled by DCI where Cyclic Redundancy Check (CRC) is scrambled with a UE-specific Radio Network Temporary Identity (RNTI), the UE-specific DCI is DCI where the CRC is scrambled with the UE-specific RNTI, the PDSCH common to the UEs is a PDSCH scheduled by the DCI where the CRC is scrambled with a common RNTI to UEs, and the DCI common to the UEs is DCI where the CRC is scrambled with the common RNTI to UEs.

17. The network side device according to claim 15, wherein the determining the set of occasions for candidate PDSCH receptions based on the first configuration information comprises one of:

a first mode in which, in the case that the first time domain resource allocation table and the second time domain resource allocation table are activated or available, determining the set of occasions for candidate PDSCH receptions based on the union of row indexes of the first time domain resource allocation table and the second time domain resource allocation table, or in the case that a specific K1 is included in both the first set of HARQ feedback timing values K1 and the second set of HARQ feedback timing values K1, determining the set of occasions for candidate PDSCH receptions based on the union of row indexes of the first time domain resource allocation table and the second time domain resource allocation table;

a second mode in which, in the case that the first time domain resource allocation table and the second time domain resource allocation table are activated or available, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH, or in the case that the specific K1 is included in both the first set of HARQ feedback timing values K1 and the second set of HARQ feedback timing values K1, determining the set of occasions for candidate PDSCH receptions based on the union of row indexes of a time domain resource allocation table, where the time domain resource allocation table is the first time-domain resource allocation table or the second time-domain resource allocation table which is determined by the type of the received PDSCH or the type of the DCI for scheduling the PDSCH; or a third mode in which, in the case that only one of the first time domain resource allocation table and the second time domain resource allocation table is activated or available, determining the set of occasions for candidate PDSCH receptions based on the union of row indexes of the activated or available time domain resource allocation table, or in the case that the specific K1 is only included in the first set of HARQ feedback timing values K1 or the second set of HARQ feedback timing values K1, determining the set of occasions for candidate PDSCH receptions based on the union of row indexes of the first time domain resource allocation table or the second time domain resource allocation table associated with the specific K1.

18. The network side device according to claim 17, wherein the method further comprises determining HARQ-ACK information bits based on at least one of a decoding result of the PDSCH at each occasion for candidate PDSCH reception in the set of occasions for candidate PDSCH receptions or a length of the HARQ-ACK codebook, wherein the determining the HARQ-ACK information bits based on at least one of the decoding result of the PDSCH at each occasion for candidate PDSCH reception in the set of occasions for candidate PDSCH receptions or the length of the HARQ-ACK codebook comprises:

in the case that the quantity of elements in the determined set of occasions for candidate PDSCH receptions is smaller than the maximum value of the first element quantity and the second element quantity, determining the corresponding HARQ-ACK information bits based on the decoding result of the PDSCH at each occasion for candidate PDSCH reception in the set of occasions for candidate PDSCH receptions, and adding Negative ACK (NACK) bits until a bit length is equal to the bit length of the HARQ-ACK codebook; or in the case that the quantity of elements in the determined set of occasions for candidate PDSCH receptions is equal to the maximum value of the first element quantity and the second element quantity, determining the corresponding HARQ-ACK information bits based on the decoding result of the PDSCH at each occasion for candidate PDSCH reception in the set of occasions for candidate PDSCH receptions.

19. The network side device according to claim 15, wherein the determining the bit length of the HARQ-ACK codebook based on the first configuration information comprises determining the bit length of the HARQ-ACK codebook based on a maximum value of first element quantity and second element quantity, the first element quantity is the quantity of elements in the first set of occasions for candidate PDSCH receptions determined based on the first time domain resource allocation table, and the second element quantity is the quantity of elements in the second set of occasions for candidate PDSCH receptions determined based on the second time domain resource allocation table.

20. The network side device according to claim 15, wherein subsequent to the determining the set of occasions for candidate PDSCH receptions based on the first configuration information, the method further comprises determining the bit length of the HARQ-ACK codebook based on the quantity of occasions for candidate PDSCH receptions in the set of occasions for candidate PDSCH receptions.

* * * * *